United States Patent
Lee et al.

(10) Patent No.: US 6,909,830 B2
(45) Date of Patent: Jun. 21, 2005

(54) METHOD AND APPARATUS FOR ON-WAFER TESTING OF AN INDIVIDUAL OPTICAL CHIP

(75) Inventors: Kevin Kidoo Lee, Malden, MA (US); Christian Hoepfner, North Andover, MA (US); Desmond Rodney Lim, Singapore (SG); Wang-Yuhl Oh, Cambridge, MA (US)

(73) Assignee: Enablence Holdings LLC, Greenville, SC (US)

( * ) Notice: Subject to any disclaimer, the term of this patent is extended or adjusted under 35 U.S.C. 154(b) by 32 days.

(21) Appl. No.: 10/298,256

(22) Filed: Nov. 15, 2002

(65) Prior Publication Data

US 2004/0013359 A1 Jan. 22, 2004

Related U.S. Application Data

(60) Provisional application No. 60/396,509, filed on Jul. 16, 2002.

(51) Int. Cl.[7] .............................................. G02B 6/20
(52) U.S. Cl. ...................................... 385/125; 385/123
(58) Field of Search ........................... 385/14, 31, 125, 385/123

(56) References Cited

U.S. PATENT DOCUMENTS

| | | | | |
|---|---|---|---|---|
| 3,864,016 A | * | 2/1975 | Dakss et al. ................... | 385/49 |
| 3,912,363 A | * | 10/1975 | Hammer ........................ | 385/49 |
| 6,337,831 B1 | | 1/2002 | Nam | |
| 6,337,871 B1 | * | 1/2002 | Choa ............................ | 372/45 |
| 2001/0021287 A1 | | 9/2001 | Jewell et al. | |
| 2003/0123793 A1 | * | 7/2003 | Johannessen ................. | 385/36 |
| 2003/0123804 A1 | * | 7/2003 | Nikonov et al. .............. | 385/49 |

OTHER PUBLICATIONS

Yasuhiro Kuwana, signal Propagation Characteristics in Polyimide Optical Wave–guide with Micro–Mirrors for Optical Multichip Module, Japanese Journal of Applied Physics. vol. 38 (1999) pp. 2660–2663, Part I, No. 4B, Apr. 1999.

* cited by examiner

Primary Examiner—Akm Enayet Ullah
Assistant Examiner—Jennifer Doan
(74) Attorney, Agent, or Firm—Allen, Dyer, Doppelt, Milbrath & Gilchrist, P.A.

(57) ABSTRACT

A method for testing an optical chip, while the optical chip is still on a wafer, utilizing an optical probe, includes the steps of creating an access point on the wafer adjacent the optical chip. Inserting a probe at the access point to optically couple the optical probe and optical chip. The optical probe includes at least a first optical waveguide for changing the direction of input light at the probe to optically couple with the optical chip at the access point.

33 Claims, 7 Drawing Sheets

METHOD AND APPARATUS FOR ON-WAFER TESTING OF AN INDIVIDUAL OPTICAL CHIP

CROSS REFERENCE TO RELATED APPLICATIONS

This application claims priority from Provisional patent Application Ser. No. 60/396,509 filed on Jul. 16, 2002.

FIELD OF THE INVENTION

The invention is directed to optics and in particular to the capability to utilize optics to test optical chips while they are still part of a wafer.

BACKGROUND OF THE INVENTION

Planar optical devices are optical devices based on waveguide technology, which are fabricated on planar substrates of various types. An optical chip based on this technology could contain only simple waveguides, single devices like couplers, or complex planar lightwave circuits consisting of a multitude of devices and functions. These optical chips are fabricated on planar substrates. Typically individual chips are fabricated in bulk on semiconductor wafers made from, for example, Si or InP. These wafers are subjected to various fabrication steps, like deposition of materials and etching, typically involving microlithography, to form the discrete optical devices in the substrate material or on top of the substrate.

Optical waveguides serve as connections between the planar optical devices as well as input and output terminals. After or during the fabrication it is desirable to test the functionality of the optical chips to prevent shipment, sale or use of non working chips. Some chips may include optical sources like lasers and detectors on the chip itself, which allows for standard electronic on-wafer testing utilizing electrical connections to the wafer. However, other chips may require the tester to couple light into the chips or out of the chips in order to perform the tests. In this case, the chip usually must be separated from the wafer to allow access to the chip to couple light from optical fibers or other chips into the waveguides at the facets of the chip. In many cases, the facets of the chip to be tested have also to be polished. A typical example is the preparation of laser bars from wafers which allows testing of edge-emitting lasers. The wafer is separated in bars to keep the number of pieces to be handled low. Nevertheless, it would be advantageous to test such lasers en masse on complete wafers because the handling of bars or chips after separation is tedious and time-consuming. Accordingly, there is a need to test the optical chips prior to separation from the wafer.

It is known in the art to test optical devices that emit or receive light vertically (perpendicular to the wafer plane). An example of a vertically accessed optical device is a VCSEL (Vertical Cavity Surface Emitting Laser). A vertical testing method of a VCSEL is disclosed in US Patent Publication 2001/0021287 A1. However, this process does not allow for vertical testing of optical devices whose input and output ports are in the plane of the wafer, with waveguides in the same plane.

Some have tried to allow for optical access from the surface of the wafer by including devices on the wafer, which redirect the light from a planar direction (parallel to the surface) to a direction perpendicular to the surface. To access the light vertically from the planar optical devices with waveguide in the wafer plane, Kuwana et al. in Japanese Journal of Applied Physics, Vol. 38 (1999) has fabricated a triangular shaped Al mirror underneath the waveguide to deflect the propagation direction of the light in the waveguide. The light is deflected by the mirror, travels upward. A similar process occurs in the reverse direction. Thus vertical access to the planar waveguide is achieved in this prior art. Another example is U.S. Pat. No. 6,337,871 B1 for a multiple edge-emitting laser components located on a single wafer and the on-wafer testing of the same, where the inventors include special devices on the wafer to redirect the light of laser perpendicular to the surface. However, these constructions require additional structure to be integrated with the chips as part of the wafer adding to the complexity and time required to manufacture such wafers.

Accordingly, a method and apparatus for testing chips on the wafer, which overcomes the shortcomings of the prior art is desired.

SUMMARY OF THE INVENTION

A method for testing an optical chip formed on an uncut wafer, the wafer including at least a substrate and said optical chip including at least a core disposed above such substrate and a cladding layer disposed on said core, the optical chip being a planar optical waveguide comprising the steps of removing some portion of the waveguide to form an access point; and inserting an optical probe adjacent to the optical chip at said access point.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

The current invention allows testing of planar optical waveguide chips, including edge-emitting lasers, from the surface of the wafer and without separating the wafer into individual chips. The invention does not require the inclusion of special devices on the wafer which redirect the light processing perpendicular to the surface. Instead, the redirection of the light is achieved in optical probes described here. The wafer under test has to be prepared only with very simple means readily available to any fabricator of such devices.

Figure 1:
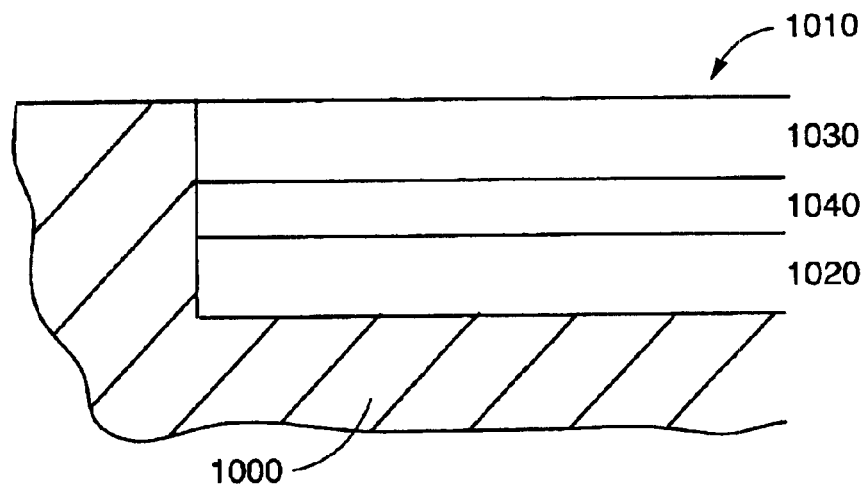
FIG. 1 is a sectional view of a waveguide formed on an uncut wafer in accordance with the prior art.

A first embodiment of the invention is a method and device for testing optical chips on the wafer level without separating the chips from the wafer. One optical terminal of the chip is shown in FIG. 1. As is known in the art, a wafer consists of the substrate 1000 with a plurality of the waveguides 1010 formed thereon. The waveguide 1010 includes a lower cladding layer 1020, a core 1040, and an upper cladding layer 1030.

Figure 2:
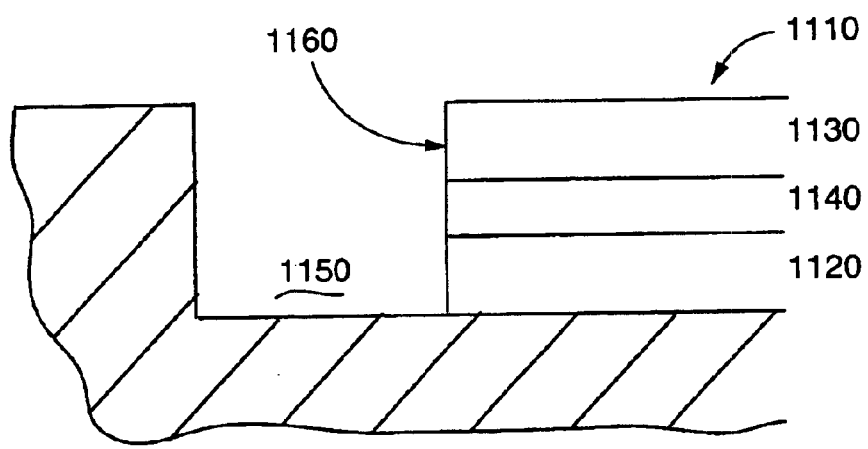
FIG. 2 is a sectional view of an optical chip formed on an uncut wafer in accordance with the present invention.

As shown in FIG. 2, a trench is etched in accordance with the invention at the end of the waveguide where optical access is needed. Trench 1150 provides sidewalls, one of which forms facet 1160 on waveguide 1110 through which the light can be coupled into the waveguide. The depth of this trench is at least below the core 1140 of waveguide 1110, but could extend deeper into substrate 1000. The width of trench 1150 need only be sufficient to allow access of the test device as described below.

The angle of facet 1160 should be close to 90° relative to the waveguide (core), but even with angles deviating from 90° the results can be sufficient for the purposes of wafer-level testing. For example, one may even want to have facet 1160 to be at 8° from verticality to reduce back reflection. The roughness of the sidewalls should be as low as possible but some roughness can be tolerated. The method by which this trench 1150 can be formed includes, but is not limited to, etching or physical removal, e.g., a shallow dice-saw cut or a scribe line that does not go through the entire substrate. Milling, such as, ion milling and Focused Ion Beam (FIB), or laser ablation can also be used for creating this trench. Making a trench on-wafer in order to open up an access point to the horizontal waveguide that is otherwise closed, is an important part of this invention.

To couple light into and out of the now exposed waveguides an optical probe is used. This optical probe is brought in close proximity to the ends of the waveguides at facet 1160. The light is coupled into an input end of the optical probe by means of optical fibers, waveguides, or by directly coupling at the input end, a light source. The output or exit end of the optical probe, which is disposed in trench 1150, is designed to change the direction of the light into the wafer plane, thereby allowing coupling into the end of waveguide 1110 on the chip. The change of direction can be accomplished by either a narrow bend or by a mirror.

Figure 3:
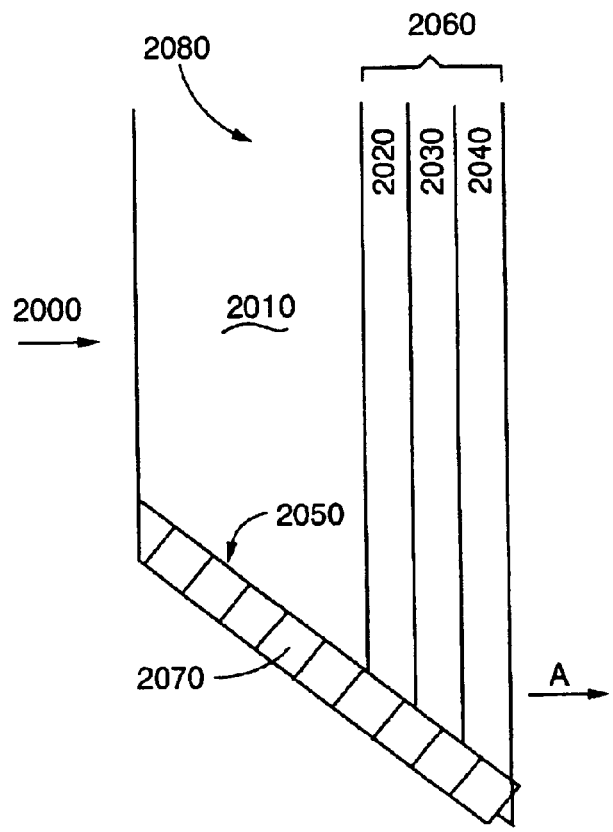
FIG. 3 is a sectional view of an optical probe constructed in accordance with the invention.

One specific embodiment of the current invention is shown in FIG. 3. The optical probe 2000 consists of a substrate 2010 with a waveguide 2060 disposed thereon. Waveguide 2060 may be a dielectric waveguide. The waveguide 2060 consists of a lower cladding 2020, a core layer 2030, and an upper cladding layer 2040. The end of the optical probe has been polished to have substantially a 45-degree angle relative to the core, providing facet 2050. In one non-limiting example, facet 2050 is covered with metal layer 2070, thereby providing a mirror. The facet 2050 can also be covered with a dielectric mirror stack that provides reflection at the wavelength that is being used. However, it should be noted that facet 2050 can also be used without any coating if the reflectivity at the facet is sufficient for deflecting enough light into the wanted direction. For example, if the facet 2050 is polished to have a smooth surface and has an interface with sufficient index difference between the waveguide 2060 and air, it will act as a mirror and provide a good reflectivity. The reflected light traveling through upper cladding 2040 is unguided in cladding 2040 in this embodiment. Probe 2000, similar to what will be discussed below, can also be made so that there is a waveguide that guides the reflected light substantially perpendicular to core layer 2030 within upper cladding layer 2040.

As a result, light entering probe 2000 at an input end 2080 exits probe 2000 at an exit end 2090 in the direction of arrow A. Accordingly, light traveling through probe 2000 in a direction not parallel to a wafer, exits probe 2000 in a direction substantially perpendicular to a facet on wafer chip 1110. Facet 2050 does not have to be at 45° with respect to the waveguide, and each of its embodiment parts, such as the core, as long as the change in the propagation direction is sufficient for the application. For example, an angle between 35° and 55° may be used if the change in the propagation direction is sufficient for achieving an acceptable coupling loss between the probe and the optical device under test. In fact, an 8-degree angle may be intentionally achieved by having a facet angle of close to 41° or 49°, which is the angle that is used in preparing optical chip facets to reduce back reflection at the interface. Or more generally, the facet 2050 can be curved but smooth to provide a focusing effect. For practical purposes, an angle substantially close to 45° is preferred for facet 2050.

An array of regularly spaced or irregularly spaced waveguides can be included on this probe in order to test multiple waveguide devices at once. One can even have both the input and output waveguides on one probe for sending and receiving the test signals through the same probe.

The facet 2050 can also be of a curved shape, rather than having a straight shape. The curve shaped facet may potentially be beneficial since it may provide a focusing or collimating effect.

Typical materials that are used in waveguide fabrication can be used in making probe 2000. The waveguide core can be made of doped silica such as Ge-doped silica, phosphorous doped silica, Silicon Oxynitride, BPSG (Bore Phosphorous Silicate Glass) or undoped silica. The waveguide claddings can be made of undoped silica, doped silica such as BPSG, Flourine doped silica, or Boron doped silica.

Figure 4:
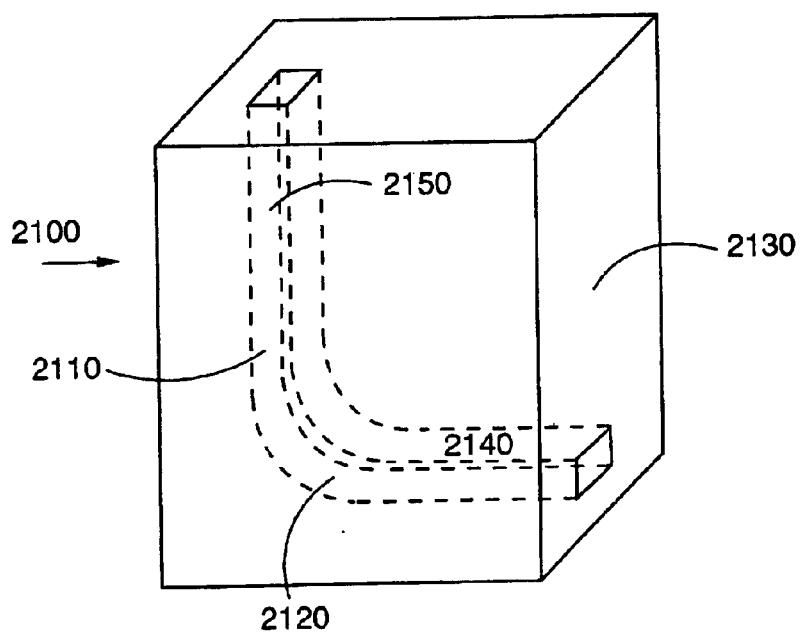
FIG. 4 is a sectional view of an optical probe constructed in accordance with a second embodiment of the invention.

Reference is now made to FIG. 4 in which another embodiment of an optical probe generally indicated as 2100 is provided. Probe 2100 includes a cladding block 2130. Planar waveguide core 2110 extends through block 2130 and includes a waveguide bend 2120 therelong between an input 2150 and an output 2140. Probe 2100 includes a cladding block 2130 to provide a change in the direction of the optical beam. The cladding block 2130 surrounds the core 211.

Figure 5:
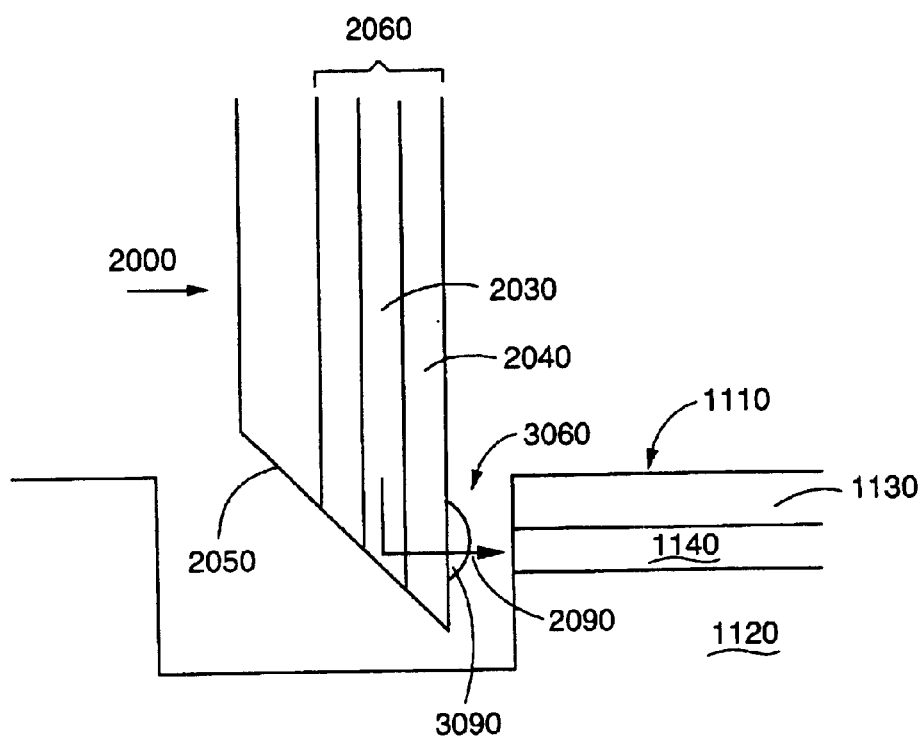
FIG. 5 is a sectional schematic view of an optical probe and optical chip used in accordance with the testing method of the invention.

FIG. 5 shows the operation of optical probe 2000. Optical probe 2000 is brought into close proximity to waveguide 1110 and then aligned to allow for coupling of reflected beam 2090 of light into the waveguide. The light traveling through core 2030 of probe 2000 changes propagation direction at the mirror (facet 2050) and travels out of core 2030, through upper cladding 2040, and exits waveguide 2060 into free space. Then light beam 2090 enters waveguide 1110 that is being tested. Because light beam 2090 that has changed the propagation direction has to exit waveguide 2060, the facet angle of facet 2050 has to be such that the angle of incidence of the light on the interface of core 2030 and upper cladding 2040 is smaller than the critical angle between core 2030 and upper cladding 2040, which is determined by the index difference between core 2030 and the upper cladding 2040. Similarly the angle of incidence of the light on the interface of upper cladding 2040 and region 3060 is smaller than the critical angle between 2040 and 3060. The index difference between core 2030 and upper cladding 2040 also determines the power loss of light while exiting the waveguide. This is because the power reflectance of the core/cladding interface between 2030 and 2040 is dependent on the index difference. The power reflectance increases as the index difference increases. A low index difference waveguide whose index difference is similar to that of fiber will have a very low power reflectance, resulting in a low power loss when the light exits the waveguide. There will, however, be a reflection between cladding layer 2040 and region 3060 due to index difference. One can fill region 3060 with a material with an index that reduces such reflection. An index matching fluid can be used for this purpose. The index matching fluid can also reduce the scattering losses due to the roughness that may exist on the exit facet of waveguide 1110.

The coupling efficiency of the optical probe can be optionally improved by applying microlens 3090 on the top surface of upper cladding 2040 of probe waveguide 2060. Microlens 3090 can be placed accurately by coupling light into the probe through the input port and illuminating the optical probe. The top surface will then have a bright spot on which the mircolens can be mounted. This microlens can be made of a polymer such as epoxy. The microlens may have its shape tailored by adjusting the affinity of the monomer to the top surface of the probe before the polymerization. Microlens 3090 can be attached to waveguide 2060 or it can be placed at some distance away from the waveguide facet.

In another embodiment, the coupling efficiency of the optical probe can be optionally improved by depositing or forming a Graded Index (GRIN) lens on the top surface of the probe as part of upper cladding 2040. The GRIN lens can focus the light into waveguide 2060, when light is traveling from waveguide 1110 to the probe or vice versa.

At an output port, the transmission of light in the reverse direction will occur. The light travels out of waveguide 1110, and then the light can be coupled into optical probe 2000 via the mirror facet via the similar reflective process discussed above.

Once the optical probe has been aligned with an optical chip on the wafer, the optical probe can be stepped through all chips on the wafer. Only fine tuning of the optical probe location with regard to the chip being tested is necessary. In this way a large number of chips can be tested efficiently.

Often an optical chip can have a multitude of input or output waveguides. In this case the optical probe can be designed to have a multitude of input or output channels matched exactly to the chip under test, since the relative positions of the waveguides are exactly known. In this way there is only one alignment necessary to provide access to all channels needed for the test. One can also design the probe and the chip under test such that both input and output can be on one probe, therefore reducing the alignment processing steps.

Thus, a large number of chips can be tested on a wafer without separating the chips from the wafer. This can result in increased efficiency in wafer testing.

Figure 6:
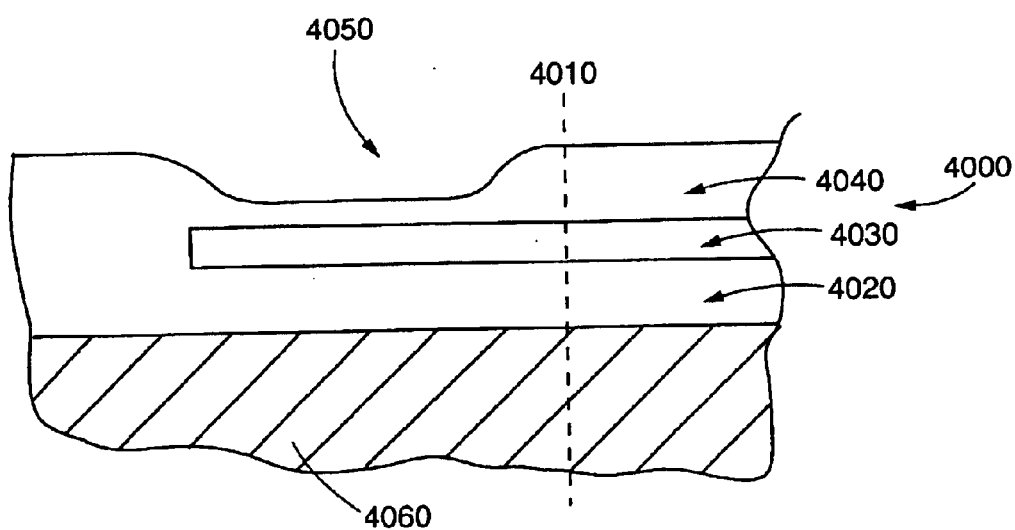
FIG. 6 is a sectional view of an optical chip formed on an uncut wafer in accordance with a second embodiment of the invention.

A second embodiment of the invention relates to testing optical chips on the wafer level without separating the chips from the wafer and without etching a trench or otherwise preparing a facet at the end of the waveguide. As shown in FIG. 6, according to one aspect of this embodiment, waveguide 4000, including lower cladding 4020, core 4030, and upper cladding 4040, has been fabricated on top of wafer substrate 4060. Waveguide 4000 is the optical circuit under test. The waveguide has been extended into an access site 4050, beyond plane 4010 where the facet for fiber or waveguide coupling will later be prepared for permanent coupling after waveguide 4000 has been separate from the wafer.

At access site 4050 upper cladding layer 4010 is partially reduced in thickness, for example, by etching upper cladding layer 4040. This etching step could be either a dedicated process step, or it could be performed as part of another etching step during the fabrication of the optical chip. The remaining thickness of upper cladding layer 4040 has to be thin enough that there is a sufficient evanescent optical field present outside of the cladding, i.e., to allow evanescent light to reach core 4030 sufficient to test waveguide chip 4000. The length of the recess has to be long enough to allow optical coupling as described below. However, the length will be mostly determined by practical considerations with regard to the access of an optical probe, as described below. The method by which access 4050 can be formed includes, but is not limited to, etching or physical removal, by way of non-limiting example, e.g., a shallow dice saw cut or scribe line.

Figure 7:
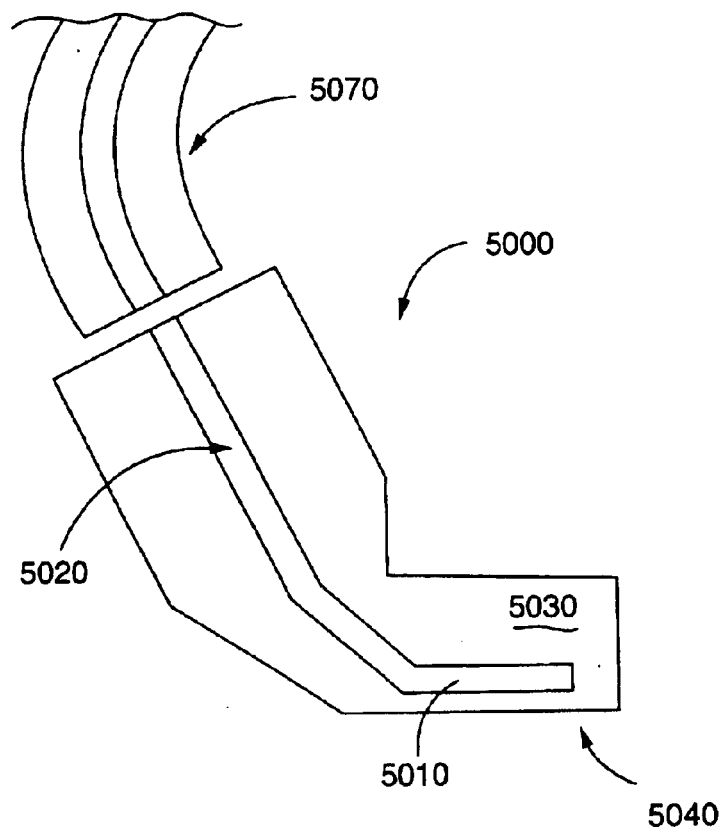
FIG. 7 is a sectional view of an optical probe constructed in accordance with another embodiment of the invention.
Figure 8:
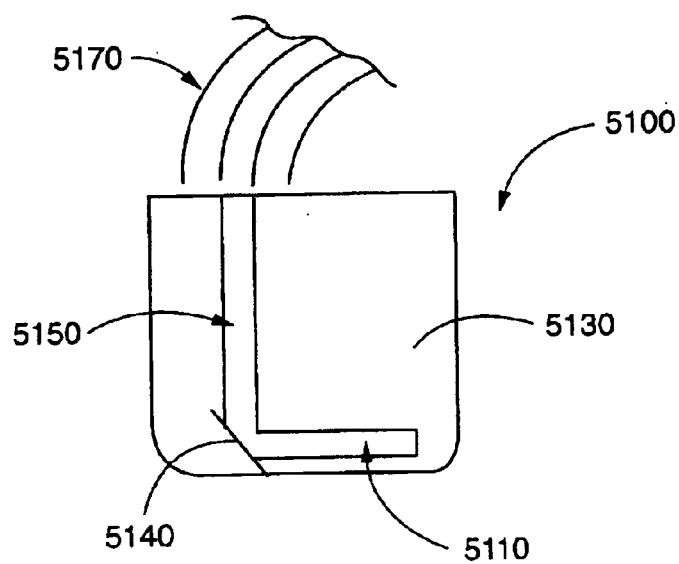
FIG. 8 is a sectional view of an optical probe constructed in accordance with yet another embodiment of the invention.

Optical probe 5000 (FIG. 7) is used to couple light into waveguide 4000 at access site 4050. Optical probe 5000 features a short piece of waveguide 5010, which fits into the recess at access site 4050 on the wafer. In a preferred embodiment, the probe is connected to optical fiber 5070, which can be connected to test equipment. FIGS. 7 and 8 show two possible embodiments of probes for use in access site 4050. Optical probe 5000 (FIG. 7), by way of example, includes planar optical waveguide chip 5000 with first waveguide core 5020 and second waveguide core 5010 and cladding region 5030. At region 5040, chip 5000 has been cut close to core 5010 to allow evanescent coupling. Optical fiber 5070 is optically coupled to chip 5000 to connect to the test equipment.

Another embodiment of an optical probe, generally indicated as 5100, for use with access point 4050 is shown in FIG. 8. Optical probe 5100 includes an optical chip formed as waveguide 5110, which is fabricated along the lower edge of optical chip 5100 and second waveguide 5150. The light in waveguide 5150 is directed into waveguide 5110 through mirror facet 5140. Waveguide 5150 is optically coupled to optical fiber 5170 so that light from optical fiber 5170 can be directed from waveguide 5110 into core 4030 of a chip to be tested.

Figure 9:
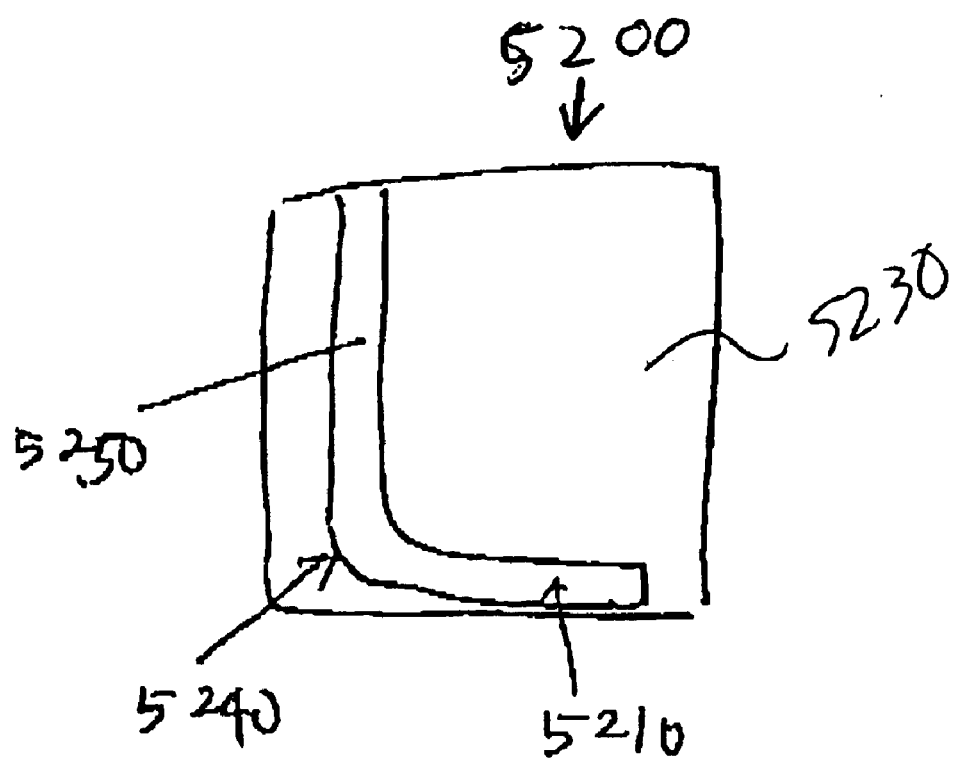
FIG. 9 is a sectional view of an optical probe constructed in accordance with yet another embodiment of the invention.

FIG. 9 shows another embodiment of optical probe, generally indicated as 5200, for use with access site 4050. Probe 5200 includes a first waveguide 5250, a second waveguide 5210 and cladding layer 5230. Waveguide 5250 is coupled to waveguide 5210 through waveguide bend 5240. Waveguide 5250 may be connected to a light source such as a laser or a fiber, or a detector for sending or receiving light through waveguide 5250. Waveguide 5210 that evanescently conducts light sideways in a direction substantially perpendicular to waveguide 5210 enables mode coupling to the optical device under test that will be placed adjacent to 5210. Waveguide 5210 is close to a chip edge (thinned cladding layer) so that a substantial amount of the evanescent field extends outside the chip for an external device to be placed close to it and achieve evanescent coupling between the two. In this embodiment, waveguides 5250 and 5210 are substantially at 90° relative to each other. For practical purposes, an angle substantially close to 90° is desired, but it is not necessary. For example, one can have an angle between 70° and 110° between waveguides 5250 and 5210 if it yields acceptable performance.

Figure 10:
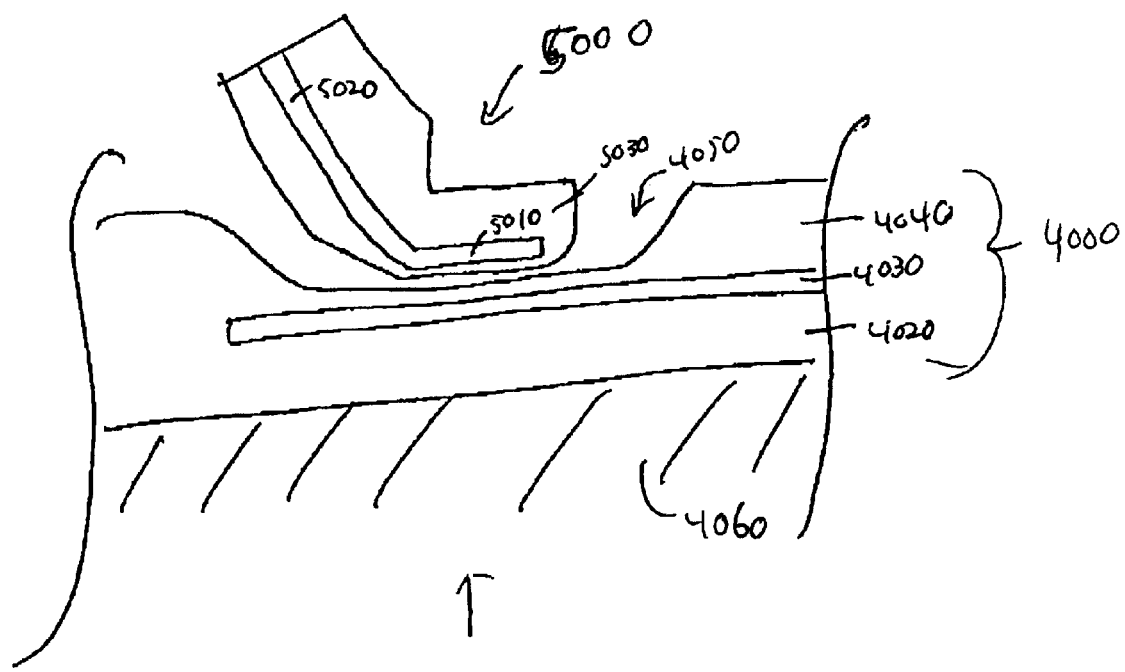
FIG. 10 is a sectional view of the use of a probe for testing an optical chip on a wafer in accordance with another embodiment of the invention.

During testing, optical probe 5000, by way of example, is aligned to waveguide 4000 at access site 4050. FIG. 10 shows how optical probe 5000 is oriented to access site 4050 on the wafer. Waveguide 5010 of optical probe 5000 and waveguide core 4030 of access site 4050 has to be aligned to allow for directional, evanescent coupling. Optical probe 5000 and access site 4050 can be either in direct contact or in close proximity, depending on the design of the respective waveguides and cores. Due to the constraints of the design the coupling may not be optimum, thereby incurring a coupling loss. This loss can be calculated, or it could be measured by means of an on-wafer calibration structure. However, in many cases on-wafer tests are performed to assess wavelength dependent characteristics of the optical chip. In this case the insertion loss is of limited importance.

As was discussed above in connection with FIG. 3, an index-matching fluid may optionally be used at the access to waveguide 1110 to mitigate the lack of verticality and/or smoothness of the sidewall. The main advantage of index matching fluid is the increased tolerance to errors in positioning and facet preparation allowing users to obtain more consistent coupling efficiency between the probe and the on-chip waveguide. The index matching fluid can be used during testing and be cleaned off before final packaging.

The probe can be coated with a soft optically transparent material, which may index match to the input waveguide, to reduce variations in waveguide to waveguide coupling errors. The surface of the probe through which light exits, may be coated with a drop of liquid that can be hardened into a shape of a lens. The lens can then focus or collimate the light coming out into the space 3060, therefore reducing the coupling loss.

The optical probe of the present invention may be used in conjunction with a proximity or force feedback system to prevent the tip of the optical probe from crashing into the chip. It can also be used in conjunction with a mechanically motorized and/or piezo-electrically actuated stage on which the tip is mounted. The relative movement of the tip with respect to the sample that is tested can be automated with software algorithms that control the mechanical motor and/or piezo-electric actuator.

The probes illustrated in this embodiment can be manufactured in a relatively large quantity and therefore can be considered as disposable elements (or a consumable). The probes are connected to a fiber or an array of optical fibers at the input (non-inserted) end for connection with the light source and the testing equipment. The whole assembly that includes fibers and the optical probe can be considered as a consumable that can be supplied in large quantities.

Figure 11:
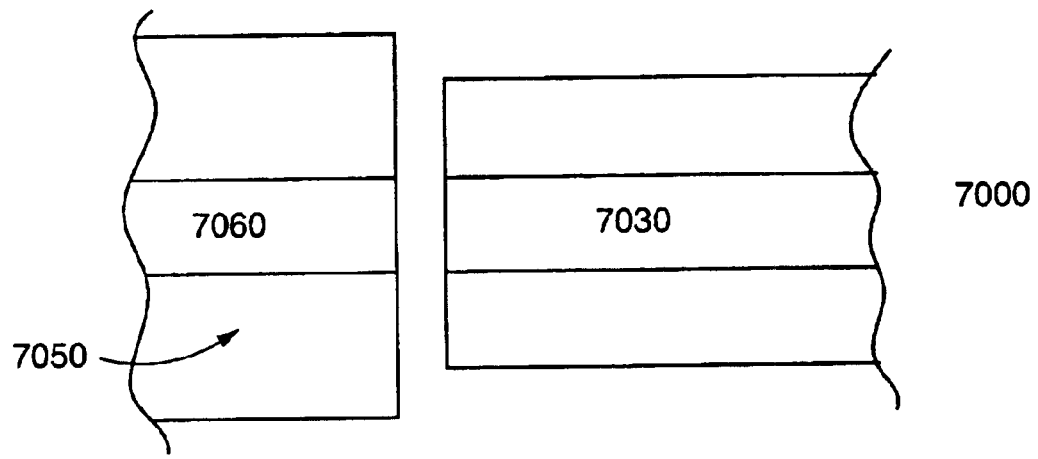
FIG. 11 is a sectional view of a probe optically coupled to an optical fiber in accordance with the invention.

FIG. 11 shows an exemplary embodiment of such an assembly. The input end of optical probe 7000 is optically connected to optical fiber 7050. Core 7030 of probe 7000 is aligned to core 7060 of optical fiber 7050 for optical connection with low loss. Typically, an adhesive is used to bond probe 7000 and fiber 7050, such as UV-curable glue. Multiple fiber (or an array of optical fiber) can be used when the probe contains multiple waveguides. To improve coupling efficiency, the mode size and numerical aperture of the probe waveguide is matched to the mode size and numerical aperture of the optical device connected at the probe input. Similarly, the mode size and numerical aperture of the output of the probe is matched to the mode size and numerical aperture of the optical chip to be tested.

When a fiber array is used, they sit on and/or are covered by a silicon or a glass piece for structural support, as commonly used in commercial fiber arrays. Additionally, the optical probe that is supplied may be a consumable item, separate from the fiber array. In this case, a method of easily connecting the optical probe to the fiber array is needed.

Figure 12:
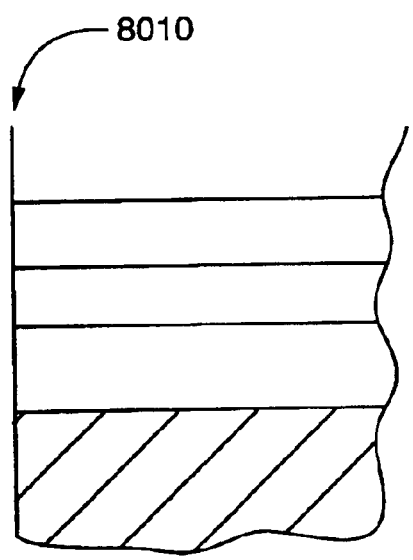
FIG. 12 is a sectional view of an optical chip separated from the wafer after having been tested in accordance with the invention.

This on-chip optical probe can also be combined with electrical testing equipment and/or electrical probes to provide high speed electro-optical testing for any chips that include edge emitting or edge receiving devices. This embodiment would be particularly useful for testing high speed electro-optic devices such as edge emitting lasers, waveguide detectors, waveguide modulators and RF photonic components After the on-wafer testing, the optical chips on the wafer are separated from each other by conventional methods, such as sawing or cleaving. At this time the access site can be separated from the actual optical chip, as shown in FIG. 12. After the separation at facet 8010, the optical chip can be processed and packaged as any chip that did not comprise the additional access site for on-wafer testing.

Thus, a large number of chips can be tested on a wafer without first separating the chips from the wafer. This can result in increased efficiency in wafer testing.

In another embodiment, the wafer containing the optical chip may be processed further without sawing or cleaving, after on-wafer testing. This embodiment of the invention allows for the testing of devices on a wafer that is in-process to provide feedback on the process, without having to destroy the wafer. The ability to continue processing a wafer with planar integrated optic waveguides is a big advantage, as it allows trimming and tuning of optical device on the wafer. In addition, it can be used for rapid defect analysis.

Thus while there have been shown and described and pointed out novel features of the present invention as applied to preferred embodiments thereof, it will be understood that various omissions and substitutions and changes in the form and details of the disclosed invention may be made by those skilled in the art without departing from the spirit and scope of the invention. It is the intention, therefore, to be limited only as indicated by the scope of the claims appended hereto.

It is also to be understood that the following claims are intended to cover all the generic and specific features of the invention herein described and all statements of the scope of the invention, which is a matter of language, might be said to fall therebetween.

We claim:

1. An optical probe for testing an optical chip integrally formed with an uncut wafer, said wafer lying in a plane comprising an optical waveguide, said waveguide having an axis not parallel to the plane, said waveguide including a cladding, a core, and a facet, the facet being disposed to cause light traveling through said core along the axis of the waveguide to travel through said cladding in a direction substantially different from said axis of the waveguide, said facet being angled such that a portion of said cladding disposed on one face of the core is not disposed coextensively with cladding on an opposed face of the core.

2. The optical probe of claim 1 where said facet is coated with one or more metals.

3. The optical probe of claim 1 where said facet is coated with a dielectric stack mirror.

4. The optical probe of claim 1, where said core is composed of a doped silica including one of a Ge doped Silica, BPSG, Phosphorous doped Silica or Silicon Oxynitride.

5. The optical probe of claim 1 where said core is composed of an undoped silica.

6. The optical probe of claim 1 where said cladding is composed of an undoped silica.

7. The optical probe of claim 1 where said cladding is composed of a doped Silica.

8. The optical probe of claim 1 further comprising an input, said input being connected to one of a fiber, a waveguide, a light source, and a detector.

9. The optical probe of claim 8, wherein said waveguide has a mode size and numerical aperture matched to the mode size and numerical aperture of the fiber, the waveguide, the light source and the detector.

10. The optical probe of claim 1 further comprising a microlens formed on said cladding.

11. The optical probe of claim 10 wherein said microlens focuses the optical beam reflected from said facet.

12. The optical probe of claim 1, further comprising a second waveguide where the light reflected from the facet passes through the second waveguide before exiting the probe.

13. The optical probe of claim 1, further comprising at least a second, and at least a third waveguide, a respective one of said at least third waveguides being optically connected to a respective one of said waveguide and another of said at least third waveguide being coupled to one of said at least second waveguide to form an array of waveguides.

14. An optical probe for testing an optical chip integrally formed with an uncut wafer, said wafer lying in a plane comprising an optical waveguide, said waveguide having an axis not parallel to the plane, said waveguide including a cladding, a core, and a facet, the facet being disposed to cause light traveling through said core along the axis of the waveguide to travel through said cladding in a direction substantially different from said axis of the waveguide, said cladding being composed of a doped Silica, the doped Silica being doped with one of fluorine and boron.

15. An optical probe for testing an optical chip integrally formed with an uncut wafer, said wafer lying in a plane comprising an optical waveguide, said waveguide having an axis not parallel to the plane, said waveguide including a cladding, a core, and a facet, the facet being disposed to cause light traveling through said core alone the axis of the waveguide to travel through said cladding in a direction substantially different from said axis of the waveguide, said waveguide being an optical fiber having a facet at one end, said facet being polished to allow reflection of the light from said facet and through the cladding of the optical fiber at an angle of substantially 90° relative to the axis.

16. The optical probe of claim 15, wherein said cladding layer includes a thinned region, the light reflecting through the cladding layer at the thinned region.

17. The optical probe of claim 15 wherein said waveguide has a mode size and numerical aperture matched to the mode size and numerical aperture of the fiber.

18. An optical probe for testing an optical chip integrally formed with an uncut wafer, said wafer lying in a plane comprising an optical waveguide, said waveguide having an axis parallel to the plane, said waveguide including a cladding, a core, and a facet, the facet being disposed to cause light traveling through said core along the axis of the waveguide to travel through said cladding in a direction substantially different from said axis of the waveguide, said waveguide having mode size and numerical aperture matched to the mode size and numerical aperture of the optical chip.

19. A method for testing an optical chip formed on an uncut wafer, the wafer including at least a substrate and said optical chip including a chip waveguide having at least a core disposed above such substrate and a cladding layer disposed on said core, the optical chip being a planar optical waveguide comprising the steps of removing some portion of the waveguide to form an access site: and inserting an optical probe adjacent to the optical chip at said access site, wherein said access site is a trench formed adjacent to said planar optical waveguide device, said trench having a depth extending to expose at least the waveguide core, further comprising the step of forming the trench by milling, said milling being performed by one of ion milling and FIB (Focused Ion Beam) technique.

20. A method for testing an optical chip formed on an uncut wafer, the wafer including at least a substrate and said optical chip including a chip waveguide having at least a core disposed above such substrate and a cladding layer disposed on said core, the optical chip being a planar optical waveguide comprising the steps of removing some portion of the waveguide to form an access site: and inserting an optical probe adjacent to the optical chip at said access site, said optical probe comprising a probe waveguide, said probe waveguide having an axis not parallel to a plane in which the wafer lies, the probe waveguide including a cladding, a core, and a facet, the facet being disposed to cause light traveling through said core along the axis of the waveguide to travel through said cladding in a direction substantially different from said axis of the waveguide, said facet being angled such that a portion of said cladding disposed on one face of the core is not disposed coextensively with the cladding on an opposed face of the core.

21. The method of claim 20, wherein said facet is coated with one or more metals.

22. The method of claim 20, wherein said facet is coated with a dielectric stack mirror.

23. The method of claim 20, wherein said waveguide core of said probe is composed of a doped Silica, including one of Ge doped Silica, BPSG, Phosphorous doped Silica and Silicon Oxynitride.

24. The method of claim 20, wherein the waveguide core of said probe is composed of undoped Silica.

25. The method of claim 20, wherein the waveguide cladding of said probe is composed of a doped Silica including one of fluorine doped Silica or boron doped Silica.

26. The method of claim 20, wherein the waveguide cladding of said probe is composed of undoped Silica.

27. The method of claim 20, wherein said optical probe includes an input, said input being connected to one of a light source and a detector.

28. The method of claim 20, wherein said optical device is on a wafer that is still in process.

29. The method of claim 20, further comprising the step of processing said waveguide to allow access to the integrated optical device.

30. The method of claim 20, wherein an input and output of said planar optical device under test is located on the same side of the optical chip: and further comprising the step of testing the optical chip with a single probe.

31. The method of claim 20, further comprising the step of placing an index matching fluid between said probe and said planar optical device.

32. A method for testing an optical chip formed on an uncut wafer, the wafer including at least a substrate and said optical chip including a chip waveguide having at least a core disposed above such substrate and a cladding layer disposed on said core, the optical chip being a planar optical waveguide comprising the steps of removing some portion of the waveguide to form an access site: and inserting an optical probe adjacent to the optical chip at said access site, said optical probe comprising a probe waveguide, said probe waveguide having an axis not parallel to a plane in which the wafer lies, the probe waveguide including a cladding, a core, and a facet, the facet being disposed to cause light travelling through said core along the axis of the waveguide to travel through said cladding in a direction substantially different from said axis of the waveguide, the waveguide of said probe having a mode size and numerical aperture matched to the mode size of the waveguide and light source, and said optical probe including an input, said input being connected to one of a light source and a detector.

33. A method for testing an optical chip formed on an uncut wafer, the wafer including at least a substrate and said optical chip including a chip waveguide having at least a core disposed above such substrate and a cladding layer disposed on said core, the optical chip being a planar optical waveguide comprising the steps of removing some portion of the waveguide to form an access site: and inserting an optical probe adjacent to the optical chip at said access site, said optical probe comprising a probe waveguide, said probe waveguide having an axis not parallel to a plane in which the wafer lies, the probe waveguide including a cladding, a core, and a facet, the facet being disposed to cause light travelling through said core along the axis of the waveguide to travel through said cladding in a direction substantially different from said axis of the waveguide, the waveguide of said probe having a mode size and numerical aperture matched to the mode size and numerical aperture of said planar optical waveguide device, and said optical probe including an input, said input being connected to one of a light source and a detector.

* * * * *